United States Patent
Pelley, III et al.

(10) Patent No.: US 7,638,903 B2
(45) Date of Patent: Dec. 29, 2009

(54) POWER SUPPLY SELECTION FOR MULTIPLE CIRCUITS ON AN INTEGRATED CIRCUIT

(75) Inventors: Perry H. Pelley, III, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 246 days.

(21) Appl. No.: 11/695,974

(22) Filed: Apr. 3, 2007

(65) Prior Publication Data

US 2008/0246341 A1 Oct. 9, 2008

(51) Int. Cl.
*H01H 9/54* (2006.01)
(52) U.S. Cl. .................................................. 307/140
(58) Field of Classification Search ............. 307/140
See application file for complete search history.

(56) References Cited

U.S. PATENT DOCUMENTS

| | | | |
|---|---|---|---|
| 4,893,271 A | 1/1990 | Davis et al. | |
| 5,508,650 A | 4/1996 | Grimm et al. | |
| 6,311,302 B1 | 10/2001 | Cassetti et al. | |
| 6,334,198 B1 | 12/2001 | Adusumilli et al. | |
| 6,385,749 B1 | 5/2002 | Adusumilli et al. | |
| 6,686,759 B1 | 2/2004 | Swamy | |
| 6,895,479 B2 | 5/2005 | Reimer et al. | |
| 6,907,548 B2 | 6/2005 | Abdo | |
| 2006/0082351 A1* | 4/2006 | Martins et al. | ............. 323/268 |
| 2006/0139827 A1* | 6/2006 | Chun et al. | ................... 361/90 |

OTHER PUBLICATIONS

Mayer et al; "Debug Support, Calibration and Emulation for Multiple Processor and Powertrain Control SoCs"; IEEE Proceedings of the Design, Automation and Test in Europe Conference and Exhibition, 2005.
McNairy et al; "Montecito: A Dual-Core, Dual-Thread Itanium Processor"; IEEE Computer Society, 2006.
Hong et al; "Power Optimization of Variable-Voltage Core-Based Systems"; IEEE Transactions on Computer-Aided Design of Integrated Circuits and Systems; vol. 18, No. 12, Dec. 1999.
Larsson et al; "Buffer and Controller Minimisation for Time-Constrained testing of System-On-Chip"; 18th IEEE International Symposium on Defect and Fault Tolerance in VLSI Systems, 2003.
Yeh; "Low-Power, High-Performance Architecture of the PWRficient Processor Family"; Hotchips 18, 2006.

* cited by examiner

*Primary Examiner*—Robert L. Deberadinis
(74) *Attorney, Agent, or Firm*—Susan C. Hill; Ranjeev Singh

(57) ABSTRACT

An integrated circuit comprising a plurality of circuits is provided. The integrated circuit further comprises a plurality of power circuits, wherein each of the plurality of power circuits can supply a selected voltage to at least one of the plurality of circuits.

21 Claims, 2 Drawing Sheets

POWER SUPPLY SELECTION FOR MULTIPLE CIRCUITS ON AN INTEGRATED CIRCUIT

BACKGROUND

1. Field

This disclosure relates generally to integrated circuits, and more specifically, to power supply selection for multiple circuits on an integrated circuit.

2. Related Art

There is a need for finer granularity of power control on integrated circuits. Such improved power control would allow better power management, reduced power consumption, lower cost operation, and more efficient use of on-chip resources.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, the present invention provides a plurality of power circuits that may be selectively used to provide power to various circuits on the integrated circuit. Thus, circuits that must operate at high frequency and peak efficiency may be provided a higher voltage than other circuits that are performing lower priority back ground tasks. In this manner, the overall power efficiency of the integrated circuit may be optimized. As the tasks performed by the various processing circuits change, the power circuit used to provide power to the various processing circuits may also be changed. Alternately, the same power circuit may remain as the power circuit providing power, but the voltage may be increased or decreased as the power requirements of the processing circuit are increased or decreased.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
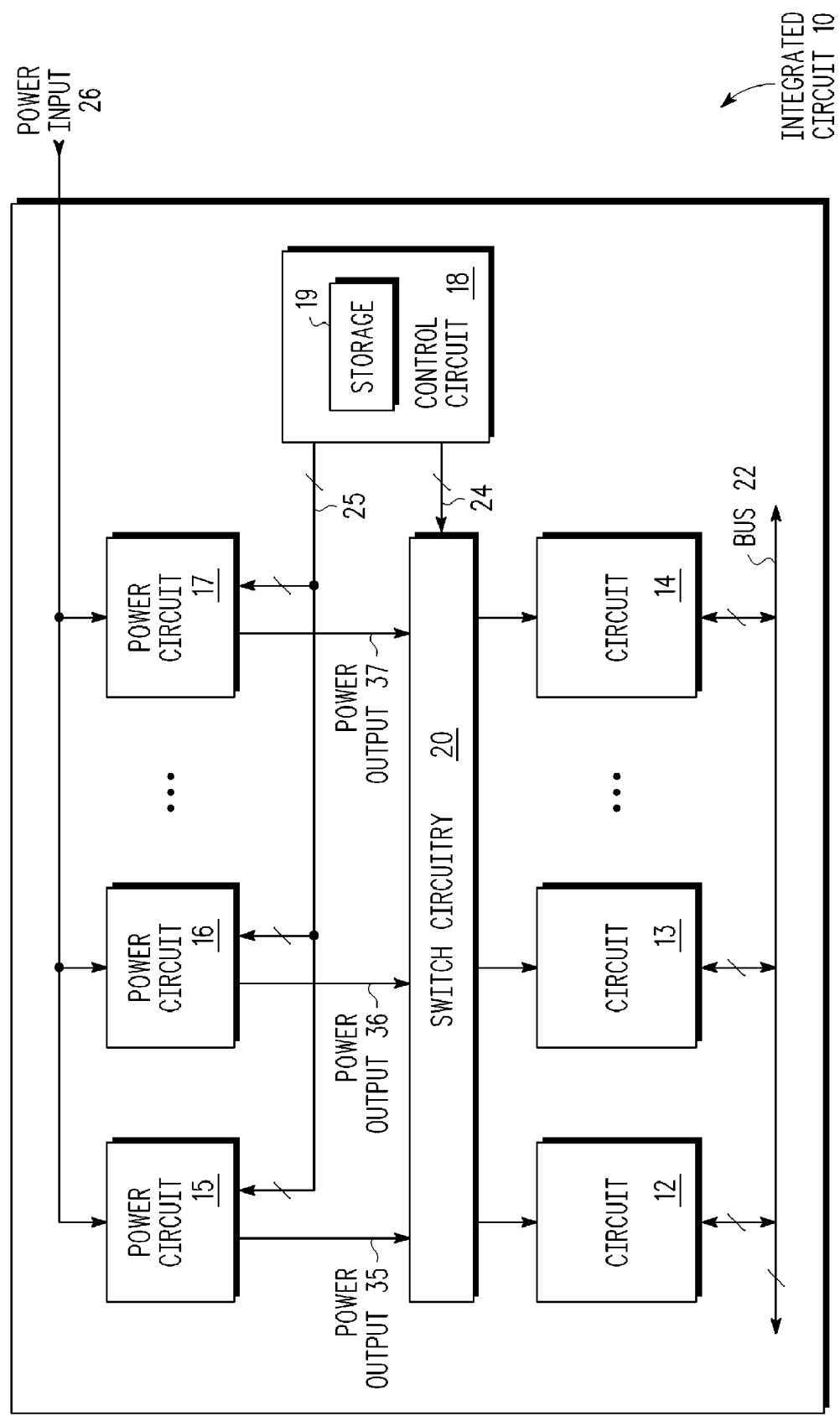
FIG. 1 illustrates, in block diagram form, an integrated circuit in accordance with one embodiment of the present invention.

FIG. 1 illustrates an integrated circuit (IC) 10 in accordance with one embodiment of the present invention. In the illustrated embodiment, IC 10 comprises a plurality of power circuits 15-17 that receive power from external to IC 10 by way of power input 26. Power input 26 can be any type of terminal or structure that can be used to make an electrical connection to an IC, such as, for example, an integrated circuit pin, a conductive bump, a wire, a conductive pad, etc. Power circuits 15-17 are also coupled to control circuit 18 by way of one or more conductors 25. In one embodiment, conductors 25 comprise a serial bus that is used to transmit control information from control circuit 18 to power circuits 15-17. In one embodiment, each power circuit 15-17 has a unique address so that each power circuit 15-17 knows whether a message sent on serial bus 25 is for that particular power circuit. Alternate embodiments may use any desired approach to provide control information from control circuit 18 to power circuits 15-17. Alternately, instead of centralizing the control of power circuits 15-17 in control circuit 18, the control of power circuits 15-17 may be distributed directly within the circuitry of power circuits 15-17 themselves.

Based on the control information it receives by way of conductors 25, power circuit 15 provides a selected voltage at power output 35 to switch circuitry 20; based on the control information it receives by way of conductors 25, power circuit 16 provides a selected voltage at power output 36 to switch circuitry 20; and based on the control information it receives by way of conductors 25, power circuit 17 provides a selected voltage at power output 37 to switch circuitry 20. Switch circuitry 20 receives control information from control circuitry 18 by way of one or more conductors 24. Switch circuitry 20 uses this control information to determine which power circuit 15-17 to couple to which circuit 12-14. Thus, switch circuitry 20 provides a configurable switch network that allows IC 10 to dynamically determine which circuits 12-14 should be coupled to which power supplying circuits 15-17 for receiving the desired voltage and power. Power circuits 15-17 are thus used to selectively provide power to one or more of circuits 12-14. Note that alternate embodiments may use any number of power circuits 15-17 and any number of circuits 12-14 that are to receive power.

In addition, in alternate embodiments, switch circuitry 20 may be designed so that only selected power circuits (e.g. 15, 16) may be coupled to a subset of circuits (e.g. 12, 13). Such alternate embodiments may reduce the complexity of the switch circuitry 20 as an acceptable tradeoff for less flexibility. Bus 22 comprises one or more conductors which may be used to allow one or more of circuits 12-14 to communicate in order to perform their intended function on IC 10. In one embodiment, bus 22 serves no specific purpose for managing power circuits 15-17. In alternate embodiments, control circuitry 18 may be coupled to bus 22 so that storage circuit 19 may be written with control information for power circuits 15-17 or with control information for switch network 20.

In one embodiment, switch circuitry 20 is a fixed, hardwired set of connections that permanently couples each one of circuits 12-14 to a corresponding one of power circuits 15-17. In various embodiments, the mapping can be one power circuit 15-17 to one processing circuit 12-14, one power circuit 15-17 to a plurality of processing circuits 12-14, or a plurality of power circuits 15-17 to one processing circuit 12-14. Note that processing circuits 12-14 may be any type of circuit that can perform a processing function, such as, for example, a microprocessor core, a digital signal processor, a coprocessor, a floating point processor, a memory, a timer, a digital to analog converter, an analog to digital converter, random logic of any kind, storage circuitry of any kind, and various circuits that perform one or more functions.

In an alternate embodiment, switch circuitry 20 may be programmable rather than fixed or hardwired so that any power circuit 15-17 may be selectively coupled to any desired circuit 12-14 for providing power. In one embodiment, this switch network is set up once and then is not changed during operation of integrated circuit 10. In this embodiment, the function of switch circuitry 20 is thus to allow different users of integrated circuit 10 to configure different connections between power circuits 15-17 and processing circuits 12-14. However, in alternate embodiments, the reconfiguration of the switch network by switch circuitry 20 remains variable and can be reconfigured dynamically during operation of integrated circuit 10 by way of control circuit 18. As one example, changes written to a programmable register (e.g. storage 19) may be used to change which power circuits 15-17 are coupled to which processing circuits 12-14 during dynamic operation of integrated circuit 10.

Power input 26 provides power to power circuits 15-17. Each power circuit 15-17 selectively converts the incoming voltage to a desired voltage. The level of this desired voltage may be determined by control circuit 18. In one embodiment, control circuit 18 allows user programmability of the voltage provided by each power circuit 15-17. In one embodiment, storage circuit 19 may be used to store user programmable information as to the desired voltage level for each power circuit 15-17. In alternate embodiments, storage circuit 19 may instead be distributed and located within a portion of each of the power circuits 15-17. Storage circuit 19 may be any type of appropriate storage circuit, such as, for example, fuses, programmable register bits, memory, latches, flip-flops, etc. In alternate embodiments, this programmability may be one time or may be allowed dynamically during operation of the integrated circuit 10. In an alternate embodiment, one or more of power circuit 15-17 convert the incoming voltage to a predetermined voltage, where the level of this predetermined voltage may be fixed or hardwired. Note that some of power circuits 15-17 may have fixed voltage outputs, while others of power circuits 15-17 may have variable voltage outputs that can be controlled by control circuit 18.

Thus, the circuitry illustrated in FIG. 1 allows each of power circuits 15-17 to provide a fixed or variable voltage, while switch circuitry 20 provides fixed or variable connections between power circuits 15-17 and processing circuits 12-14.

Figure 2:
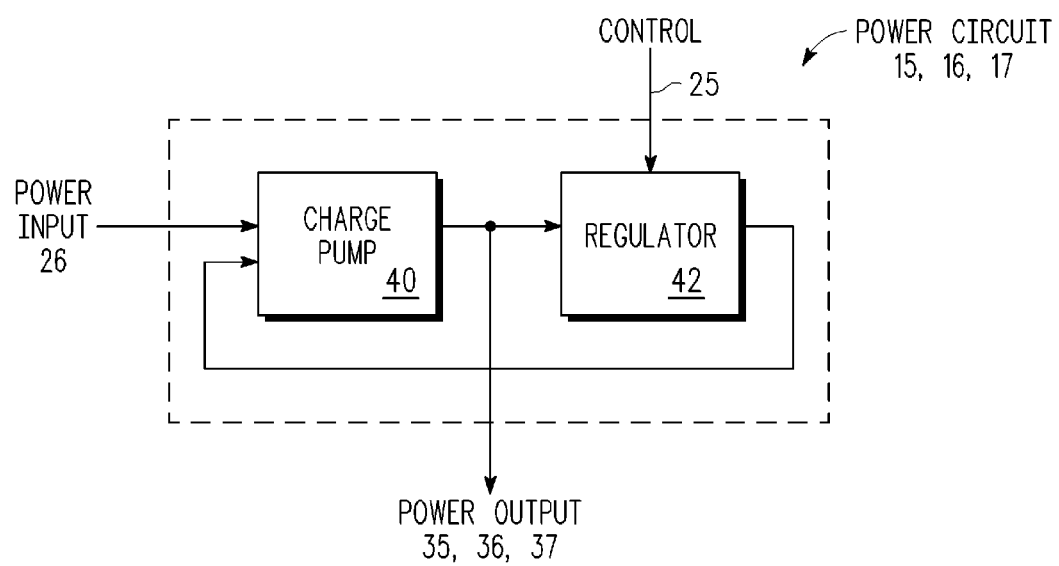
FIG. 2 illustrates, in block diagram form, a power circuit of FIG. 1 in accordance with one embodiment of the present invention.

FIG. 2 illustrates a power circuit 15, 16, or 17 of FIG. 1 in accordance with one embodiment of the present invention. Charge pump 40 receives power input 26. In one embodiment, power input 26 is provided from an external power supply (not shown) that is external to the integrated circuit 10. Charge pump 40 then provides the power output to regulator 42. Based on the control information received by one or more control conductors 25, regulator 42 provides feedback to change pump 40 as to whether the voltage provided as power output 35, 36, 37 should be increased, decreased, or remain the same. Note that in one embodiment, power output 35, 36, 37 may be a higher voltage, a lower voltage, or approximately the same voltage as power input 26. The current provided by power circuits 15-17 may be controlled in a similar manner as is the voltage.

By now it should be appreciated that there has been provided a plurality of power supplying circuits 15-17 that can be selectively used to provide power to one or more circuits 12-14. The voltage provided by power circuits 15-17 can be varied, as well as which power circuits are coupled to provide power to which processing circuits 12-14. Thus, based on the power requirements of various circuits 12-14, it is possible to use different power circuits 15-17 to provide power. Note that in alternate embodiments, power circuits 15-17 may be identical to each other, may be similar to each other, or may be quite different from each other. Similarly, in alternate embodiments, functional circuits 12-14 may be identical to each other, may be similar to each other, or may be quite different from each other, and their power needs may vary based on the real time demands that occur during operation of IC 10.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit comprising a plurality of circuits, the integrated circuit comprising:
    control circuitry for providing first control information and for providing second control information;
    a first power circuit for receiving the first control information and for providing a first voltage,
    wherein the first voltage is determined by the first control information, and
    wherein the first power circuit comprises a first charge pump and a first regulator coupled via a first feedback path from the first regulator to the first charge pump;
    a second power circuit for receiving the first control information and for providing a second voltage,
    wherein the second voltage is determined by the first control information, and
    wherein the second power circuit comprises a second charge pump and a second regulator coupled via a second feedback path from the second regulator to the second charge pump; and
    switching circuitry coupled to the plurality of circuits, to the first power circuit, and to the second power circuit, said switching circuitry receiving the second control information,
    wherein the first power circuit is couplable via the switching circuitry to a first one of the plurality of circuits in response to the second control information received by the switching circuitry, and
    wherein the second power circuit is couplable via the switching circuitry to said first one of the plurality of circuits in response to the second control information received by the switching circuitry.

2. The integrated circuit of claim 1, wherein each of the plurality of circuits comprises a processing core.

3. The integrated circuit of claim 1, wherein the first power circuit provides the first voltage to more than one of the plurality of circuits.

4. The integrated circuit of claim 1, wherein the first and second power circuits are provided the first control information via a serial bus.

5. The integrated circuit of claim 1, wherein the plurality of circuits and the first and second power circuits are packaged as a single integrated circuit package comprising a plurality of integrated circuits.

6. The integrated circuit of claim 5, wherein the plurality of integrated circuits communicate via a serial bus.

7. The integrated circuit of claim 1, wherein the first voltage provided by the first power circuit is higher than an input voltage received by the first power circuit.

8. The integrated circuit of claim 7, wherein the second voltage provided by the second power circuit is higher than the input voltage received by the second power circuit.

9. The integrated circuit of claim 1, wherein the first one of the plurality of circuits is initially coupled to the first power circuit, and is dynamically switched by the switching circuitry to be coupled to the second power circuit.

10. An integrated circuit comprising a plurality of circuits, the integrated circuit comprising:
    a plurality of power circuits, wherein each of the plurality of power circuits can supply a selected voltage to more than one of the plurality of circuits; and
    switching circuitry coupled to the each of the plurality of circuits and to each of the plurality of power circuits, said switching circuitry receiving control information,
    wherein the switching circuitry switches a first one of the plurality of circuits from being coupled to the first power circuit to being coupled to the second power circuit in response to the control information.

11. The integrated circuit of claim 10, wherein each of the plurality of circuits comprises a processing core.

12. The integrated circuit of claim 10, wherein each of the plurality of power circuits comprises a charge pump and a regulator.

13. The integrated circuit of claim 10, wherein the plurality of circuits and the plurality of power circuits are packaged as a single integrated circuit package comprising a plurality of integrated circuits.

14. The integrated circuit of claim 13, wherein the plurality of integrated circuits communicate via a serial bus.

15. The integrated circuit of claim 10, wherein a second one of the plurality of circuits is coupled via the switching circuitry to receive power from the first power circuit when the control information configures a first connectivity, and said second one of the plurality of circuits is coupled via the switching circuitry to receive power from the second power circuit when the control information configures a second connectivity.

16. The integrated circuit of claim 10, wherein at least one of the plurality of power circuits can supply a selected voltage to at least a subset of the plurality of circuits, wherein the subset of the plurality of circuits comprises at least three circuits.

17. A method for providing a selected voltage to one of a plurality of circuits located on an integrated circuit, the method comprising:
    in response to a control signal configuring a first connectivity, coupling a first power circuit to a first one of a plurality of circuits for providing power from the first power circuit to the first one of the plurality of circuits; and
    in response to the control signal configuring a second connectivity, coupling a second power circuit to said first one of the plurality of circuits for providing power from the second power circuit to said first one of the plurality of circuits.

18. The method of claim 17 further comprising receiving the control signal via a serial bus connected to the first power circuit and to the second power circuit.

19. The method of claim 17, wherein a first voltage provided by the first power circuit to said first one of the plurality of circuits is greater than an input voltage provided to the integrated circuit, and wherein a second voltage provided by the second power circuit to said first one of the plurality of circuits is less than the input voltage provided to the integrated circuit.

20. The method of claim 17, further comprising:
in response to the control signal configuring a third connectivity, decoupling the first power circuit from said first one of the plurality of circuits and coupling the second power circuit to said first one of the plurality of circuits.

21. The method of claim 17, wherein the control signal which configures the connectivity between the plurality of circuits and the first and second power circuits is at least one of a pre-determined control signal or a dynamically generated control signal.

* * * * *